US006635733B2

(12) United States Patent
Yahata et al.

(10) Patent No.: US 6,635,733 B2
(45) Date of Patent: Oct. 21, 2003

(54) ELASTOMERIC POLYPROPYLENE

(75) Inventors: Tsuyoshi Yahata, Ichihara (JP); Masato Nakano, Ichihara (JP); Yoshiyuki Ohgi, Ichihara (JP); Tsutomu Ushioda, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 133 days.

(21) Appl. No.: 09/850,152

(22) Filed: May 8, 2001

(65) Prior Publication Data

US 2002/0002261 A1 Jan. 3, 2002

(30) Foreign Application Priority Data

May 23, 2000 (JP) ........................................ 2000-151675

(51) Int. Cl.$^7$ ............................................. C08F 210/06
(52) U.S. Cl. ........................ 526/348; 526/161; 526/172; 526/351; 526/160; 526/943
(58) Field of Search ................................ 526/351, 172, 526/161

(56) References Cited

U.S. PATENT DOCUMENTS

| | | | |
|---|---|---|---|
| 3,175,999 A | 3/1965 | Natta et al. ................. 260/93.7 |
| 4,335,225 A | 6/1982 | Collette et al. .............. 525/240 |
| 5,594,080 A | 1/1997 | Waymouth et al. .......... 526/126 |
| 5,840,948 A * | 11/1998 | Rohrmann et al. ............ 556/11 |
| 5,969,070 A | 10/1999 | Waymouth et al. .......... 526/351 |
| 6,169,051 B1 * | 1/2001 | Mitani et al. ................ 502/103 |
| 6,326,493 B1 * | 12/2001 | Mitani et al. ................... 546/4 |
| 6,458,982 B1 * | 10/2002 | Schottek et al. ............... 556/53 |
| 2001/0031834 A1 * | 10/2001 | Ushioda et al. ............. 525/240 |
| 2001/0053833 A1 * | 12/2001 | Nakano et al. .............. 526/127 |
| 2002/0002261 A1 * | 1/2002 | Yahata et al. ................ 526/351 |

FOREIGN PATENT DOCUMENTS

| | | | |
|---|---|---|---|
| DE | 300 293 | 6/1992 | |
| EP | 0 426 638 | 5/1991 | |
| EP | 0 427 696 | 5/1991 | |
| EP | 0 427 697 | 5/1991 | |
| JP | 1-501950 | 7/1989 | |
| JP | 1502036 | 7/1989 | |
| JP | 3-179005 | 8/1991 | |
| JP | 3-179006 | 8/1991 | |
| JP | 3-207704 | 9/1991 | |
| JP | 9-510745 | 10/1997 | |
| JP | 2001-288221 A * | 10/2001 | ........... C08F/10/06 |
| JP | 2002-47314 A * | 2/2002 | ........... C08F/10/06 |
| WO | WO 88/05792 | 8/1988 | |
| WO | WO 88/05793 | 8/1988 | |
| WO | WO 92/00333 | 1/1992 | |

OTHER PUBLICATIONS

John A. Ewen, "Mechanisms of Stereochemical Control in Propylene Polymeriations with Soluble Group 4B Metallocene/Methylalumoxane Catalysts", J. Am., Chem. Soc., vol. 106, No. 21, 1984, pp. 6355–6364.

Chien, et al., "Two–State Propagation Mechanism for Propylene Polymerization Catalyzed by rac–[anti–Ethylidene(1–$\eta^5$–tetramethylcyclo–pentadienyl) (1–$\eta^5$–indenyl)]dimethyltitanium", J. Am. Chem. Soc., 113, 1991, pp. 8569–8570.

Cheng et al., "Consecutive Two–State Statistical Polymerization Models", Macromelecules, vol. 25, No. 25, 1992, pp. 6980–6987.

Llinas et al., "Crystalline–Amorphous Block Polypropylene and Nonsymmetric ansa–Metallocene Catalyzed Polymerization", Macromolecules, vol. 25, No. 4, 1992, pp. 1242–1253.

Zambelli et al., "Communications to the Editor", Macromolecules, vol. 6, No. 6, Nov.–Dec. 1973, pp. 925–926.

Zambelli et al., "Communications to the Editor", Macromolecules, vol. 8, No. 5, Sep.–Oct. 1975, pp. 687–689.

Tsutsui et al., "Propylene homo– and copolymerization with ethylene using an ethylenebis(1–indenyl) zirconium dichloride and methylaluminoxane catalyst system", Polymer, vol. 30, Jul. 1989, pp. 1350–1356.

* cited by examiner

*Primary Examiner*—David W. Wu
*Assistant Examiner*—Rip A. Lee
(74) *Attorney, Agent, or Firm*—Leydig, Voit & Mayer, Ltd.

(57) ABSTRACT

An elastomeric polypropylene wherein (a) an isotactic pentad ($I_5$) is 0.150–0.749, (b) a different bond due to a 2,1-insertion reaction is 0.11–20 mol %, (c) a different bond due to a 1,3-insertion reaction is 0–10 mol % and (d) a melting point (Tm) is 50–160° C., (a) to (c) being determined from $^{13}C$ NMR spectra, which is obtainable by the polymerization of propylene using any one of a metallocene catalyst (I) comprising a metallocene compound (A), an activating compound (B) and if desired, an organoaluminum compound (C), a supported metallocene catalyst (II) prepared by supporting the metallocene catalyst (I) on a finely particulate support (D), and a supported metallocene catalyst (III) prepared by adding an organoaluminum compound (E) to the supported metallocene catalyst (II). In particular, it has excellent transparency and elastic characteristics.

17 Claims, No Drawings

ELASTOMERIC POLYPROPYLENE

FIELD OF THE INVENTION

This invention relates to an elastomeric polypropylene with excellent transparency. More particularly, the invention relates to an elastomeric polypropylene with excellent transparency, flexibility and elastic recovery.

BACKGROUND OF THE INVENTION

In general, it is thought that a crystalline polypropylene consists mostly of an isotactic or syndiotactic structure and an amorphous polypropylene consists mostly of an atactic structure.

U.S. Pat. No. 3,175,999 discloses a polypropylene prepared by fractionation from a polymer mixture containing an isotactic polypropylene and an atactic polypropylene as a major component and also discloses that the polypropylene is an elastomeric polypropylene with elastic properties due to a stereoblock structure wherein an isotactic block and an atactic block are arranged alternately.

As a process for producing such polypropylene having a stereoblock structure wherein an isotactic block and an atactic block are arranged alternately, the so-called stereoblock polypropylene at the polymerization reaction stage, German Patent 300,293 discloses a process using a catalyst comprising a supported titanium halide or vanadium halide, and U.S. Pat. No. 4,335,225 discloses a process using a catalyst comprising tetraalkylzirconium or tetraalkyl titanium supported on a metal oxide.

These heterogeneous catalysts have a plurality of different types of heterogeneously catalytic active sites, and therefore the product obtained with such catalyst is a mixture of plural heterogeneous polymers which can be fractionated by extraction fractionation with a solvent. Different fractions fractionated from said mixture have typically different molecular weight and molecular weight distribution, respectively and their physical properties are different from one another.

It is known that a metallocene catalyst can be used to produce selectively a polymer having an atactic, isotactic or syndiotactic structure. As disclosed by Ewen et al. in J. Am. Chem. Soc., 106, 6355–6364 (1984), a bridged metallocene catalyst of a racemic structure can be used to produce an isotactic polypropylene, and a bridged metallocene catalyst of a meso structure can be used to produce an atactic polypropylene.

Metallocene catalysts which can produce polypropylene with elastic properties include those reported by Chien, Linas et al in J. Am. Chem. Soc., 113, 8569–8570 (1991), those reported by Cheng, Babu et al in Macromolecules, 25, 6980–6987 (1992) and those reported by Linas, Dong et al in Maclomolecules, 25, 1242–1253 (1992).

However, the catalysts reported in these references have a polymerization activity as low as $3.5 \times 10^5$ (g-polymer/mol·Metal) and the molecular weight of the resulting polymer does not exceed 200,000. The composition of the resultant polypropylene was so homogeneous as to dissolve completely in diethyl ether, which did not achieve the elastic properties due to the stereoblock structure as mentioned above. Further reportedly, the polypropylene had a melting point of lower than 70° C., an elongation at break of 1300% at maximum and a tensile tension of 12.1 MPa.

In Japanese Patent Kohyo Hei 9-510745, Waymouth et al has proposed new metallocene catalyst containing a stereoblock structure wherein an isotactic structure and an atactic structure are arranged alternately, which can produce an elastic polypropylene with extensive elastic properties. The catalysts proposed therein are non-bridged metallolcene catalysts containing principally a substituted indenyl group as a ligand. These catalysts can contribute to the control of polymer molecule structure at a rate slower than the insertion of olefin, but faster than the average time required for forming a single polymer molecule chain, thus resulting in forming the stereoblock structure in the polypropylene molecule chain in the process of polymerization reaction.

Such elastic polypropylene is generally called "elastomeric polypropylene". It is known that these prior elastomeric polypropylenes have a performance of the same level as a plasticized poly vinyl chloride in respect of the elastic recovery and also they have typically a performance of about 70–95 HDA in respect of a durometer hardness of type A measured in accordance with JIS K7215, which shows the performance level to replace part of the plasticized polyvinylchloride.

However, these prior elastomeric polypropylenes are inferior in transparency to a plasticized polyvinylchloride. In particular, this tendency is remarkable in the application for which relatively high durometer hardness of about 85–95 HDA is required. To use polypropylene as a substitute of the plasticized polyvinylchloride with which we are anxious about a bad influence to environment, the development of elastomeric polypropylene with high transparency has been demanded even in such application for which relatively high durometer hardness has been required.

SUMMARY OF THE INVENTION

An object of the present invention is to provide an elastomeric polypropylene with excellent transparency. Another object of the invention is to provide an elastomeric polypropylene having high transparency even in relatively high durometer hardness. Further object of the invention is to provide an elastomeric polypropylene having high transparency and high elastic properties.

According to the present invention, there is provided an elastomeric polypropylene wherein (a) an isotactic pentad ($I_5$) is 0.150–0.749, (b) a different bond due to a 2,1-insertion reaction is 0.11–20 mol %, (c) a different bond due to a 1,3-insertion reaction is 0–10 mol % and (d) a melting point (Tm) is 50–160° C., (a) to (c) being determined from $^{13}C$ NMR spectra, obtainable by the polymerization of propylene using any one of a metallocene catalyst (I) comprising a metallocene compound (A), an activating compound (B) and if desired, an organoaluminum compound (C); a supported metallocene catalyst (II) prepared by supporting the metallocene catalyst (I) on a finely particulate support (D); and a supported metallocene catalyst (III) prepared by adding an organoaluminum compound (E) to the supported metallocene catalyst (II).

DETAILED DESCRIPTION OF THE INVENTION

The elastomeric polypropylene of the present invention may have also an elongation at break of 100–2,000%, an ultimate tensile strength of 5–35 MPa, a permanent set of 3–75% and a compression set of 30–90% which were measured in accordance with JIS K6301 using said polypropylene.

Further, the elastomeric polypropylene of the invention may have a durometer hardness of type A (HDA) of 30–99 which was measured in accordance with JIS K7215 using said polypropylene.

Furthermore, the elastomeric polypropylene of the invention may have a weight average molecular weight (Mw) of 30,000–1,000,000.

In addition, the elastomeric polypropylene of the invention may have a haze of 1–55% which was measured in accordance with ASTM 1003 using a pressed sheet having a thickness of 1 mm prepared from said polypropylene.

Further, the elastomeric polypropylene of the invention may have a molecular weight distribution (ratio (Mw/Mn) of the weight average molecular weight (Mw) to a number average molecular weight (Mn)) of 1.5–4.0.

Of the requirements for characterizing the elastomeric polypropylenes of the present invention, those wherein (a) an isotactic pentad ($I_5$) is 0.150–0.749, (b) a different bond due to a 2,1-insertion reaction is 0.11–20 mol %, (c) a different bond due to a 1,3-insertion reaction is 0–10 mol % are calculated from the $^{13}C$ NMR spectra determined in accordance with the following method.

More specifically, the polymer to be tested was dissolved in a mixed solution of o-dichlorobenzene/benzene bromide with 8/2 weight ratio so as to provide 20% by weight of a polymer concentration. This solution was determined for $^{13}C$ NMR spectrum under the condition of 67.20 MHz and 130° C. As a measuring device, a JEOL-GX270 (trade name) spectrometer manufactured by Nihon Densi K.K. in Japan can be used for example.

The term "isotactic pentad ($I_5$)" as used herein refers to the isotactic sequence in terms of a pentad unit in the olefin polymer molecular chain determined from $^{13}C$ NMR spectrum which was proposed by A. Zambelli et al in Macromolecules Vol. 6, 925–926 (1973). A method for deciding the assignment of peak in the determination of $^{13}C$ NMR spectrum was performed in accordance with the assignment proposed by A. Zambelli et al in Macromolecules Vol. 8, 687–689 (1975).

The characterization requirement (a), isotactic pentad ($I_5$) is the proportion of propylene unit containing 5 successive meso bonds which are present in all propylene units in the olefin polymer molecule. The lower the isotactic pentad ($I_5$) the lower the isotacticity. This shows low stereoregularity. The isotactic pentad ($I_5$) of the present elastomeric polypropylene is 0.150–0.749, preferably 0.200–0.749 and more preferably 0.250–0.749.

The characterization requirement (b), "a different bond due to a 2,1-insertion reaction" and the characterization requirement (c), "a different bond due to a 1,3-insertion reaction" are the proportion of a different bond due to 2,1- and 1,3-insertion reactions in the olefin polymer molecule chain which is determined from $^{13}C$ NMR spectra in accordance with the method proposed by T. Tsutsui et al in POLYMER Vol. 30, 1350–1356 (1989).

The different bond due to 2,1-insertion reaction (b) is 0.11–20 mol %, preferably 0.11–18 mol % and more preferably 0.11–15 mol %.

The different bond due to 1,3-insertion reaction (c) is 0–10 mol %, preferably 0–8 mol % and more preferably 0–5 mol %.

Particularly by specifying the different bonds (b) and (c) in the above-described ranges, the elastomeric polypropylene of the present invention has excellent flexibility, elastic recovery and transparency.

Of the requirements for characterization of the present elastomeric polypropylene, (d) a melting point (Tm) of 50–160° C. is calculated from the results measured by differential scanning calorimeter (DSC) in accordance with the following manner.

The melting point (Tm) was measured using a DSC 7 type differential scanning calorimeter manufactured by Perkin Elmer Co. Initially, the polymer to be tested was heated from room temperature to 230° C. at a rate of 30° C./min, kept at the same temperature for 10 minutes, and then cooled down to −20° C. at a rate of −20° C./min, and kept at the same temperature for 10 minutes. Subsequently, the temperature was elevated again at a rate of 20° C./min, during which a temperature showing a peak of melting was defined as a melting point.

The elastomeric polypropylene of the present invention has the value of 50–160° C., preferably 55–160° C., more preferably 60–160° C. in the melting point (Tm). The elastomeric polypropylene may have two or more peaks of melting in the ranges of these values, i.e. two or more melting points.

The elastomeric polypropylene of the present invention is excellent in elastic recovery, and the elongation at break measured in accordance with JIS K6301 is preferably 100–2,000%, more preferably 500–2,000%, still more preferably 500–1,800%, and most preferably 850–1,800%. The ultimate tensile strength is preferably 5–35 MPa and more preferably 5–30 MPa. The permanent set is preferably 3–75% and more preferably 3–70%, and the compression set is preferably 30–90% and more preferably 30–85%.

The elastomeric polypropylene of the present invention is excellent in flexibility, and the durometer hardness of type A (HDA) measured in accordance with JIS K7215 is preferably 30–99 HDA, more preferably 35–99 HDA and most preferably 40–99 HDA. The present elastomeric polypropylene can achieve an excellent effect of high transparency even in the use wherein the durometer hardness of type A is relatively high, i.e., in the range of 80–95 HDA, particularly 85–95 HDA, which was observed that when the prior elastomeric polypropylene was used, the transparency of the resulting molded article was not sufficient.

The elastomeric polypropylene of the present invention has a weight average molecular weight (Mw) of preferably 30,000–1,000,000, more preferably 40,000–1,000,000 and most preferably 50,000–1,000,000. The weight average molecular weight (Mw) is calculated from the results measured by a gel permeation chromatography (GPC) in accordance with the following manner.

The polymer to be tested is dissolved in o-dichlorobenzene so as to provide a concentration of 0.05% by weight in the solution, and this solution is measured at 135° C. by the gel permeation chromatography (GPC) method using as a column a mixed polystyrene gel column, e.g. PSK gel GMH6-HT (trade name) manufactured by Toso K.K. in Japan. As a measuring device, GPC-150C (trade name) manufactured by Waters Co. Ltd. is used for instance.

The elastomeric polypropylene of the present invention has a haze of preferably 1–55%, more preferably 1–50%, most preferably 1–20%, which was measured in accordance with ASTM 1003 using a pressed sheet having a thickness of 1 mm prepared from said polypropylene.

The elastomeric polypropylene of the present invention has a molecular weight distribution (ratio (Mw/Mn) of the weight average molecular weight (Mw) to a number average molecular weight (Mn)) of preferably 1.5–4.0 and more preferably 1.8–4.0. The number average molecular weight (Mn) can be calculated from the results measured by a gel permeation chromatography (GPC) method.

The term "polypropylene" as used herein refers to a propylene homopolymer or a propylene/olefin copolymer of propylene and at least one olefin other than propylene. The propylene/olefin copolymer is preferably a copolymer containing a propylene unit of 50% or more based on the weight of the copolymer. Olefins other than propylene can include olefins of 2–10 carbon atoms other than propylene, illustrative examples of which are ethylene, 1-butene, 1-hexene, 1-octene or the like and the mixture of two or more olefins. The polypropylene of the present invention is preferably a propylene homopolymer or a propylene/ethylene random copolymer.

The term "(co) polymerization" as used herein refers to homopolymerization or copolymerization.

As a catalyst in the production of the present elastomeric polypropylene, the following catalysts are used which include a metallocene catalyst (I) comprising a metallocene compound (A), an activating compound (B) and an organoaluminum compound (C) used if desired; a supported metallocene catalyst (II) prepared by supporting the metallocene catalyst (I) on a finely particulate support (D); and a supported metallocene catalyst (III) prepared by adding an organoaluminum compound (E) to the supported metallocene catalyst (II).

As an illustrative example of the metallocene compound (A), the metallocene compounds of the following formula (1) can be used suitably.

$$L_2MX_2 \quad (1)$$

In the formula (1), M is titanium, zirconium or hafnium. Each X may be identical or different and selected from halogen, alkoxy and hydrocarbon group of 1–7 carbon atoms. Halogen can include fluorine, chlorine, bromine and iodine. Alkoxy can include methoxy, ethoxy, propoxy, isopropoxy, butoxy, t-butoxy, hexyloxy, cyclohexyloxy or the like. Hydrocarbon group of 1–7 carbon atoms can include a straight- or branched-chain alkyl such as methyl, ethyl, propyl, iso-propyl, n-butyl, iso-butyl, tert-butyl, sec-butyl, pentyl, hexyl, heptyl or the like; and a cyclic alkyl which may be substituted by said chain alkyl, such as cyclopropyl, cyclobutyl, cyclohexyl or the like.

Each L may be identical or different and represented by the following formula (2).

$$Ra\text{—}Ind \quad (2)$$

In the formula (2), Ra represents a monocyclic- or polycyclic-heteroaromatic group containing a hetero atom selected from the group consisting of oxygen, sulfur and nitrogen. The monocyclic- or polycyclic-heteroaromatic group containing oxygen can include furyl and benzofuryl, and furyl can include 2-furyl, 3-furyl or the like. The monocyclic- or polycyclic-heteroaromatic group containing sulfur can include thienyl and benzothienyl, and thienyl can include 2-thienyl, 3-thienyl or the like. The monocyclic- or polycyclic-heteroaromatic group containing nitrogen can include pyrrolyl, pyridyl, indolyl and quinolyl. Pyrrolyl can include 1-pyrrolyl, 2-pyrrolyl and 3-pyrrolyl. Pyridyl can include 2-pyridyl, 3-pyridyl and 4-pyridyl. Indolyl can include 1-indolyl and 3-indolyl. Quinolyl can include 1-quinolyl and 3-quinolyl.

In the heteroaromatic group Ra, alkyl, aryl, aralkyl, alkoxy and substituted silyl may be substituted on the atom forming the aromatic group, and further adjacent substituents may be joined together to form a cyclic structure. Illustrative examples of these substituents can include methyl, ethyl, tert-butyl, phenyl, vinyl, methoxy, trimethylsilyl, vinyldimethylsilyl, phenyldimethylsilyl, methoxydimethylsilyl or the like.

Of the heteroaromatic groups, 2-furyl, 3-furyl, 2-thienyl, 3-thienyl, 2-pyrrolyl, 3-pyrrolyl, 2-pyridyl, 3-pyridyl, 4-pyridyl, benzofuryl, benzothienyl, 3-indolyl, 1-quinolyl and 3-quinolyl are preferable, furyl is more preferable and 2-furyl is most preferable. Illustrative examples of 2-furyl can include 2-furyl, 2-benzofuryl, 2-(5-methyl) furyl, 2-(5-tert-butyl)furyl, 2-(5-trimethylsilyl)furyl, 2-(5-vinyldimethylsilyl)furyl, 2-(4,5-benzofuryl) and 2-(4,5-dimethyl)furyl.

In the formula (2), "Ind" stands for indenyl and cyclopentaphenanthryl. The indenyl and cyclopentaphenanthryl may be substituted by other substituents than the heteroaromatic group. These substituents can include alkyl, aryl, aralkyl, alkoxy, substituted silyl, benzo, substituted benzo or the like. Preferable are aryl or benzo. In particular, said substituent is preferably bonded to at least 4-position of indenyl. More specifically, an embodiment wherein at least one of phenyl and naphthyl is bonded to 4-position of indenyl or an embodiment wherein two benzo groups are respectively bonded to 4- and 5-position of indenyl is preferable. Most preferable is an embodiment wherein phenyl is bonded to 4-position of indenyl.

Illustrative examples of preferable substituted indenyl can include 1-methylindenyl, 4-methylindenyl, 2-phenylindenyl, 4-phenylindenyl, 4-naphthylindenyl and 4,5-benzoindenyl. Illustrative examples of preferable substituted cyclopentaphenanthryl can include 4-methyl cyclopentaphenanthryl and 5-methylcyclopentaphenanthryl.

Non-limitative examples of metallocene compounds represented by formula (1) can include bis[2-(2-furyl) cyclopentaphenanthryl]zirconium dichloride, bis[2(2-furyl) cyclopentaphenanthryl]hafnium dichloride, bis(2-(2-furyl) indenyl)zirconium dichloride, bis(2-(2-furyl)indenyl) zirconium dibromide, bis(2-(2-furyl)indenyl)zirconium methylchloride, bis(2-(2-furyl)indenyl)zirconium dimethyl, bis(2-(2-furyl)indenyl)zirconium diphenyl, bis(2-(2-thienyl) indenyl)zirconium dichloride, bis(2-(N-pyrrolyl)indenyl) zirconium dichloride, bis(2-(2-pyridyl)indenyl)zirconium dichloride, bis(2-(2-benzofuryl)indenyl)zirconium dichloride, bis(2-(2-indolyl)indenyl)zirconium dichloride, bis(2-(2-quinolyl)indenyl)zirconium dichloride, bis(2-(2-furyl)-1-methylindenyl)zirconium dichloride, bis(2-(2-furyl)-4-methylindenyl)zirconium dichloride, bis(2-(2-furyl)-4-phenylindenyl)zirconium dichloride, bis(2-(2-furyl)-4-naphthylindenyl)zirconium dichloride, bis(2-(2-furyl)-4,5-benzoindenyl)zirconium dichloride, bis(2-(2-(5-trimethylsilyl)furyl)indenyl)zirconium dichloride, bis(2-(2-(5-vinyldimethylsilyl)furyl)indenyl)zirconium dichloride, bis(2-(2-(5-phenyl)furyl)indenyl)zirconium dichloride, bis (2-(2-(5-methyl)furyl)indenyl)zirconium dichloride, bis(2-(2-(4,5-dimethyl)furyl)indenyl)zirconium dichloride, bis(2-(2-furyl)indenyl)hafnium dichloride, bis(2-(2-furyl)indenyl) hafnium dibromide, bis(2-(2-furyl)indenyl) hafnium methylchloride, bis(2-(2-furyl)indenyl)hafnium dimethyl, bis(2-(2-furyl)indenyl)hafnium diphenyl, bis(2-(2-thienyl) indenyl)hafnium dichloride, bis(2-(2-pyrrolyl)indenyl) hafnium dichloride, bis(2-(2-pyridyl)indenyl)hafnium dichloride, bis(2-(2-benzofuryl)indenyl)hafnium dichloride, bis(2-(2-indolyl)indenyl)hafnium dichloride, bis(2-(2-quinolyl)indenyl)hafnium dichloride, bis(2-(2-furyl) indenyl) titanium dichloride, bis(2-(2-furyl)indenyl) titanium dibromide, bis(2-(2-furyl)indenyl)titanium methylchloride, bis(2-(2-furyl)indenyl)titanium dimethyl, bis(2-(2-furyl)indenyl) titanium diphenyl, bis(2-(2-thienyl) indenyl)titanium dichloride, bis(2-(2-pyrrolyl)indenyl) titanium dichloride, bis(2-(2-pyridyl)indenyl)titanium dichloride, bis(2-(2-benzofuryl)indenyl)titanium dichloride, bis(2-(2-indolyl)indenyl) titanium dichloride, bis(2-(2-quinolyl)indenyl) titanium dichloride or the like. Of these compounds, bis(2-(2-furyl)indenyl)zirconium dichloride, bis(2-(2-(5-methyl) furyl)indenyl)zirconium dichloride, bis (2-(2-furyl)-4-phenylindenyl)zirconium dichloride and bis (2-(2-benzofuryl)indenyl)zirconium dichloride are preferable.

As the activating compound (B), an organoaluminum oxy compound and a compound which reacts with the metallocene compound (A) to form an ion pair are used. As the organoaluminum oxy compound, an aluminoxane represented by the following formula (3) or (4) is used suitably.

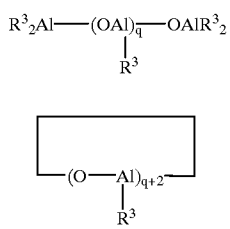

(3)

(4)

wherein $R^3$ represents a hydrocarbon group of 1 to 6 carbon atoms, preferably 1 to 4 carbon atoms, which can include alkyl such as methyl, ethyl, propyl, butyl, isobutyl, pentyl, hexyl; alkenyl such as allyl, 2-methylallyl, propenyl, isopropenyl, 2-methyl-1-propenyl, butenyl; cycloalkyl such as cyclopropyl, cyclobutyl, cyclopentyl, cyclohexyl; and aryl. Of these, alkyl is especially preferred and each $R^3$ may be identical or different.

q is an integer of 4 to 30, preferably 6 to 30, especially preferably 8 to 30.

The above-mentioned aluminoxanes can be prepared under various known conditions. More specifically, the following methods can be illustrated.
(1) A method of reacting a trialkyl aluminum directly with water in an organic solvent such as toluene, ether or the like;
(2) A method of reacting an trialkyl aluminum with salts containing water of crystallization such as copper sulfate hydrate, aluminum sulfate hydrate;
(3) A method of reacting an trialkyl aluminum with water impregnated in silica gel or the like;
(4) A method of reacting a mixture of trimethyl aluminum and tri-isobutyl aluminum directly with water in an organic solvent such as toluene, ether or the like;
(5) A method of reacting a mixture of trimethyl aluminum and tri-isobutyl aluminum with salts containing water of crystallization such as copper sulfate hydrate, aluminum sulfate hydrate or the like; and
(6) A method of reacting tri-isobutyl aluminum with water impregnated in silica gel or the like, followed by reacting with trimethyl aluminum.

As the compound which reacts with the metallocene compound (A) to form an ion pair, Lewis acids, ionic compounds, borane compounds and carborane compounds can be recited as disclosed in Japanese Patent Kohyo Hei 1-501950, Japanese Patent Kohyo Hei 1-502036, Japanese Patent Kokai Hei 3-179005, Japanese Patent Kokai Hei 3-179006, Japanese Patent Kokai Hei 3-207704, WO92/00333 or the like.

As the Lewis acid, Lewis acid containing boron is used, non-limitative examples of which can include trifluoroboron, triphenylboron, tris(4-fluorophenyl)boron, tris(3,5-fluorophenyl)boron, tris(4-fluoromethylphenyl) boron, tris(p-tolyl)boron, tris(o-tolyl)boron, tris(3,5-dimethylphenyl)boron, tris(pentafluorophenyl)boron or the like. Of these, tris(pentafluorophenyl)boron is especially preferred.

The ionic compound is a salt consisting of a cationic compound and an anionic compound. The anion has a function of reacting with a metallocene compound, cationizing the metallocene compound and forming an ion pair to stabilize a transition metal cation species. Such anions include an organoboron compound anion, an organoarsenic compound anion and an organoaluminum compound anion. Of these anions, preferable are those which are relatively bulky and stabilize the transition metal cation. The cations include an metal cation, an oranometallic cation, a carbonium cation, trityl cation, oxonium cation, sulfonium cation, phosphonium cation, ammonium cation or the like. More specifically, triphenylcarbenium cation, tributylammonium cation, N,N-dimethylammonium cation, ferrosenium cation or the like are included.

Of these, ionic compounds containing a boron compound are preferable as the anion. Specifically, trialkyl-substituted ammonium salts include, for example, triethylammonium tetra(phenyl)boron, tripropylammonium tetra(phenyl)boron, tri(n-butyl) ammonium tetra(phenyl)boron, trimethylammonium (p-tolyl)boron, trimethylammonium (o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tri(n-butyl)ammonium tetra(o-tolyl)boron, tri(n-buyl)ammonium tetra(4-fluorophenyl)boron or the like.

N,N-dialkylanilinium salts include, for example, N,N-dimethylanilinium tetra(phenyl)boron, N,N-diethyl anilinium tetra(phenyl)boron, N,N-2,4,6-pentamethylanilinium tetra(phenyl)boron or the like. Dialkylammonium salts include, for example, di(n-propyl) ammonium tetra(pentafluorophenyl)boron, dicyclohexylammonium tetra(pentafluorophenyl)boron or the like. Triarylphosphonium salts include, for example, trimethylphosphonium tetra(phenyl)boron, tri (methylphenyl)phosphonium tetra(phenyl)boron, tri (dimethylphenyl)phosphonium tetra(phenyl)boron or the like.

In the present invention, ionic compounds containing a boron atom can also include triphenylcarbenium tetraxis (pentafluorophenyl)borate, N,N-dimethylanilinium tetraxis (pentafluorophenyl)borate, and ferroseniumtetra (pentafluorophenyl)borate.

An organoaluminum compound (C) used, if desired, in the metallocene catalyst (I) used in the production of the elastomeric polypropylene of the present invention is a compound represented by the following formula (5).

$$AlR^4_س R^5_t X_{3-(s+t)} \qquad (5)$$

In the formula (5), $R^4$ and $R^5$ represent each independently a hydrocarbon group such as an alkyl group of 1–10 carbons, a cycloalkyl group, an aryl group or the like, a phenyl group which may have a substituent such as alkoxy, fluorine, methyl, trifluorophenyl or the like, X is a halogen atom, and s and t are any integer satisfying $0<s+t\leq 3$.

The organoaluminum compounds represented by the above formula (5) can include, e.g., a trialkylaluminum such as trimethylaluminum, triethylaluminum, tri-isopropyl aluminum, tri-isobutylaluminum, tri-n-butylaluminum, tri-n-hexylaluminum, tri-n-octylaluminum or the like; a dialkylaluminum hydride such as dimethylaluminum hydride, diethylaluminum hydride, diisopropylaluminum hydride, diisobutylaluminum hydride or the like; a dialkylaluminum halide such as dimethylaluminum chloride, dimethylaluminum bromide, diethylaluminum chloride, diisopropylaluminum chloride or the like; an alkylaluminum sesquihalide such as methylaluminum sesquichloride, ethylaluminum sesquichloride, ethylaluminum sesquibromide, isopropylaluminum sesquichloride or the like. These may be used as a mixture of two or more compounds. Preferable organoaluminum compound is a trialkylaluminum such as triethylaluminum, tri-isobutylaluminum, tri-n-butylaluminum, tri-n-hexylaluminum, tri-n-octylaluminum or the like. Most preferable are triethylaluminum and tri-isobutylaluminum.

As a finely particulate support (D) used in the supported metallocene catalyst (II) which is an embodiment of the metallocene catalyst used in the production of the present elastomeric polypropylene, any organic and inorganic finely particulate supports may be used, but inorganic finely particulate supports are preferable.

The inorganic finely particulate supports are granular or spherical, having a particle size of 5–300 $\mu$m, preferably 10–200 $\mu$m. They are preferably porous, having a specific surface of 50–1,000 m$^2$/g, preferably 100–700 m$^2$/g and a pore volume of 0.3–2.5 m$^3$/g.

Preferred finely particulate inorganic supports are metal oxides, e.g., $SiO_2$, $Al_2O_3$, MgO, $TiO_2$, ZnO or the mixture thereof. The supports comprising $SiO_2$ or $Al_2O_3$ as a main component are especially preferable. More specific inorganic compounds include $SiO_2$, $Al_2O_3$, MgO, $SiO_2$—$Al_2O_3$, $SiO_2$—MgO, $SiO_2$—$TiO_2$, $SiO_2$—$Al_2O_3$—MgO, etc. $SiO_2$ is especially preferable.

In the production of the elastomeric polypropylene, a supported metallocene catalyst (III) can be used which is prepared by adding an organoaluminum compound (E) to the supported metallocene catalyst (II). The organoaluminum compound (E) may be added together with the supported metallocene catalyst (II) prior to the polymerization of propylene. Alternatively, it may be supplied upon the polymerization of propylene, independently of the catalyst (II). As the organoaluminum compound (E), an organoaluminum compound represented by the above formula (5) can be used.

As a process for the production of the elastomeric polypropylene, known olefin polymerization processes can be employed which include a slurry polymerization process wherein an olefin is (co)polymerized in an inert solvent including an aliphatic hydrocarbon such as butane, pentane, hexane, heptane, isooctane or the like, an alicyclic hydrocarbon such as cyclopentane, cyclohexane, methylcyclohexane or the like, an aromatic hydrocarbon such as toluene, xylene, ethylbenzene or the like, and gasoline fraction, hydrogenated diesel oil and the like; a bulk polymerization process wherein an olefin itself is used as a solvent; a gas phase polymerization process wherein an olefin is polymerized in gas phase; and a combination of these two or more processes.

The (co)polymerization conditions employed in the above-mentioned processes are usually the same as in the polymerization of olefins using known Ziegler-Natta catalyst system. For example, the polymerization is performed at a (co)polymerization temperature of −50 to 150° C., preferably −10 to 100° C. and most preferably 20 to 80° C., for about 1 minute to 20 hrs, by feeding propylene or a mixture of propylene and other olefins so as to maintain the polymerization pressure in the range of atmospheric pressure to 7 MPa, preferably 0.2 to 5 MPa, in the presence of hydrogen as a molecular weight modifier.

In the present invention, the use of the catalyst (I), (II) or (III) containing the metallocene compound (A) can control the structure of the polymer forming in the reaction system in the polymerization process of propylene, thereby producing polypropylene at the rate of the configuration of an atactic block and an isotactic block being selected. As a result, the elastomeric polypropylene of the present invention can be produced in high activity as the polypropylene having excellent thermoplastic elastic property, excellent transparency, narrow molecular weight distribution and high molecular weight.

After the (co)polymerization of olefin is completed, known after-treatments such as deactivation of catalyst, removal of catalyst residues and drying are carried out if necessary, to produce the aimed elastomeric polypropylene. The resultant elastomeric polypropylene may be blended if necessary, with various additives such as antioxidants, ultra-violet absorbing agents, antistatic agents, nucleating agents, lubricants, flame retardants, antiblocking agents, colorants, inorganic or organic fillers, and further various synthetic resins. Subsequently, the polymer is usually melt-kneaded and cut into granulates or pellets for the manufacture of various moldings.

The elastomeric polypropylene of the present invention is a material excellent in flexibility, elastic recovery and transparency, and can be used suitably as a molding material for various molded articles such as films, sheets, blow moldings, injection moldings or the like.

EXAMPLE

The invention is further illustrated by the following Examples and Comparative Examples. The definitions of the terms and the methods for measuring the physical properties used in the Examples and Comparative Examples are mentioned below.

(1) Isotactic pentad ($I_5$): It was determined in the above-mentioned manner using as a measuring device a JEOL-GX270 (trade name) spectrometer manufactured by Nihon Densi K.K. in Japan.

(2) Different bond due to a 2,1-insertion reaction and a different bond due to a 1,3-insertion reaction (Unit: mol %) : It was determined in the above-mentioned manner using as a measuring device a JEOL-GX270 (trade name) spectrometer manufactured by Nihon Densi K.K. in Japan. The detection lower limit is 0.02 mol %.

(3) Melting point (Tm) (Unit: ° C.): It was determined in the above-mentioned manner using as a measuring device a DSC 7 type differential scanning calorimeter manufactured by Perkin Elmer Co. Ltd.

(4) Elongation at break (unit: %) and ultimate tensile strength (unit: MPa): Tension test was performed using the following device and under the following condition. Preparation of sample: The produced elastomeric polypropylene was melt at 200° C. and pressed to form a sheet having a thickness of 1 mm. This sheet was cooled to 30° C. The resultant pressed sheet was used as a sample. Size of sample: A JIS No. 3 dumbbell specimen was prepared in accordance with JIS K6301. Measuring device: "Tesnsometer-10 universal testing machine" (trade name) manufactured by Monsanto Co. Ltd. Measuring condition: 7 cm chuck distance, 2 cm mark distance, 500 mm/min crosshead speed (5) Permanent set (unit: %): Using the pressed sheet formed in the same manner as in item (4), a JIS No. 1 dumbbell specimen was prepared in accordance with JIS K6301. This specimen was 100% elongated and held for 10 minutes. The specimen was taken out and the length after additional 10 minutes was measured. The specimen having small permanent set exhibits excellent elastic recovery.

(6) Compression set (Unit: %): Using the pressed sheet formed in the same manner as in item (4), four specimens simply punched from the sheet in accordance with JIS K6301 were piled and compressed to a thickness of 75%. The compressed specimen was held at 70° C. for 22 hours. Subsequently, the specimen was taken out and the thickness after additional 30 minutes was measured. The specimen having small compression set exhibits excellent elastic recovery.

(7) Durometer hardness: Using the pressed sheet formed in the same manner as in item (4), six specimens simply punched from said sheet were piled, and the durometer hardness of type A was measured in accordance with JIS K7215.

(8) Weight average molecular weight (Mw) and a molecular weight distribution (ratio (Mw/Mn) of weight average molecular weight (Mw) to number average molecular weight (Mn)): It was determined in the above-mentioned manner using as a column "PSK gel GMH6-HT" (trade name) manufactured by Toso K.K. in Japan and as a measuring device "GPC-150C" (trade name) manufactured by Waters Co. Ltd.

(9) Haze (unit: %): Using the pressed sheet formed in the same manner as in item (4), a specimen simply punched from said sheet was measured for haze in accordance with ASTM 1003.

(10) Melt flow rate (MFR) (unit: g/10 min.): It was measured in accordance with JIS K7210 under condition 14 in Table 1 (21.18 N load, 230° C.).

Example 1

Production of Elastomeric Polypropylene (ELPP-1)

In a 1.5 L autoclave sufficiently purged with nitrogen gas, $3.2 \times 10^{-3}$ mol (in terms of an Al atom) of "MMAO 3A" (trade name) manufactured by Toso-Aczo Co. Ltd as aluminoxane (B) and 800 ml of a liquefied propylene monomer were charged, and the mixture was stirred for 5 minutes while keeping at 30° C. Subsequently, the metallocene catalyst (I) prepared by mixing $9.8 \times 10^{-6}$ mol (in terms of a Zr atom) of bis(2-(2-furyl)indenyl)zirconium dichloride as metallocene compound (A) with $1.7 \times 10^{-3}$ mol (in terms of an Al atom) of MMAO for 15 minutes was introduced under pressure with 200 ml of a liquefied propylene to initiate a polymerization at 30° C., and the polymerization was continued under a constant pressure at 30° C. for 2 hours. After the passage of 2 hours, 20 ml of methanol were introduced under pressure to stop the polymerization.

Subsequently, a propylene monomer was purged, 1000 ml of toluene were added and the mixture was stirred at 50° C. for 90 minutes. 50 ml of methanol, 5 g of sodium hydroxide and 250 ml of pure water were added, the mixture was stirred at 70° C. for 90 minutes and cooled. A water phase was withdrawn using a separating funnel and a toluene phase was washed with pure water until the washed water phase was neutral. A large quantity of methanol was added to the washed toluene phase to recover the precipitated polymer which was then dried to a constant weight with a vacuum dryer to obtain 58 g of an elastomeric polypropylene.

Evaluation of Physical Properties of Elastomeric Polypropylene (ELPP-1)

0.1 part by weight of 2,6-di-tert. butyl-p-cresol was incorporated per 100 parts by weight of the resultant elastomeric polypropylene and the mixture was kneaded at 200° C. for 5 minutes using a mixer, laboplasto mill "MODEL 30C150" (trade name) manufactured by Toyo Seiki K.K. Subsequently, the polymer was analyzed and it was found that an isotactic pentad ($I_5$) was 0.409, a different bond due to a 2,1-insertion reaction was 0.28 mol %, a different bond due to a 1,3-insertion reaction was less than the detection lower limit, i.e. less than 0.02 mol %, a melting point (Tm) was 141° C., a weight average molecular weight (Mw) was 246,000, a ratio (Mw/Mn) of the weight average molecular weight (Mw) to a number average molecular weight (Mn) was 2.4 and MFR was 1.6 g/10 minutes.

The production of the elastomeric polypropylene was repeated four times under the same condition as mentioned above. The physical properties of each material using the resultant polymer were measured. The result was shown in the following Table 1.

Example 2

Production of Elastomeric Polypropylene (ELPP-2)

In a 1.5 L autoclave sufficiently purged with nitrogen gas, $1.3 \times 10^{-3}$ mol (in terms of an Al atom) of "MMAO 3A" (trade name) manufactured by Toso-Aczo Co. Ltd as aluminoxane (B) and 800 ml of a liquefied propylene monomer were charged, and the mixture was stirred for 5 minutes while keeping at 40° C. Subsequently, the metallocene catalyst (I) prepared by mixing $4.5 \times 10^{-6}$ mol (in terms of a Zr atom) of bis(2-(2-furyl)-4-phenylindenyl)zirconium dichloride as metallocene compound (A) with $9.0 \times 10^{-4}$ mol (in terms of an Al atom) of MMAO for 15 minutes was introduced under pressure with 200 ml of a liquefied propylene to initiate a polymerization at 40° C., and the polymerization was continued under a constant pressure at 40° C. for 2 hours. After the passage of 2 hours, 20 ml of methanol were introduced under pressure to stop the polymerization.

Subsequently, a propylene monomer was purged, 1000 ml of toluene were added and the mixture was stirred at 50√ C. for 90 minutes. 50 ml of methanol, 5 g of sodium hydroxide and 250 ml of pure water were added, the mixture was stirred at 70° C. for 90 minutes and cooled. A water phase was withdrawn using a separating funnel and a toluene phase was washed with pure water until the washed water phase was neutral. A large quantity of methanol was added to the washed toluene phase to recover the precipitated polymer which was then dried to a constant weight with a vacuum dryer to obtain 45 g of an elastomeric polypropylene.

Evaluation of Physical Properties of Elastomeric Polypropylene (ELPP-2)

0.1 part by weight of 2,6-di-tert. butyl-p-cresol was incorporated per 100 parts by weight of the resultant elastomeric polypropylene and the mixture was kneaded at 200° C. for 5 minutes using a mixer, laboplasto mill "MODEL 30C150" (trade name) manufactured by Toyo Seiki K.K. Subsequently, the polymer was analyzed and it was found that an isotactic pentad ($I_5$) was 0.679, a different bond due to a 2,1-insertion reaction was 11.47 mol %, a different bond due to a 1,3-insertion reaction was 0.61 mol %, a melting point (Tm) was 107° C., a weight average molecular weight (Mw) was 210,000, a molecular weight distribution (ratio (Mw/Mn) of the weight average molecular weight (Mw) to a number average molecular weight (Mn)) was 2.4 and MFR was 4.7 g/10 minutes.

The production of the elastomeric polypropylene was repeated four times under the same condition as mentioned above. The physical properties of each material using the resultant polymer were measured. The result was shown in the following Table 1.

Comparative Example 1

Production of Propylene Polymer (PP-1)

In a 1.5 L autoclave sufficiently purged with nitrogen gas, $3.6 \times 10^{-3}$ mol (in terms of an Al atom) of "MMAO 3A" (trade name) manufactured by Toso-Aczo Co. Ltd as aluminoxane (B) and 800 ml of a liquefied propylene monomer were charged, and the mixture was stirred for 5 minutes while keeping at 20° C. Subsequently, the metallocene catalyst (I) prepared by mixing $1.5 \times 10^{-5}$ mol (in terms of a Zr atom) of bis(2-phenylindenyl)zirconium dichloride as metallocene compound (A) with $3.6 \times 10^{-3}$ mol (in terms of an Al atom) of MMAO for 15 minutes was introduced under pressure with 200 ml of a liquefied propylene to initiate a polymerization at 20° C., and the polymerization was continued under a constant pressure at 20° C. for 2 hours. After the passage of 2 hours, 20 ml of methanol were introduced under pressure to stop the polymerization.

Subsequently, a propylene monomer was purged, 1000 ml of toluene were added and the mixture was stirred at 50° C. for 90 minutes. 50 ml of methanol, 5 g of sodium hydroxide and 250 ml of pure water were added, and the mixture was stirred at 70° C. for 90 minutes and cooled. A water phase was withdrawn using a separating funnel and a toluene phase was washed with pure water until the washed water phase was neutral. A large quantity of methanol was added to the washed toluene phase to recover the precipitated polymer which was then dried to a constant weight with a vacuum dryer to obtain 42 g of propylene polymer.

Evaluation of Physical Properties of Propylene Polymer (PP-1)

0.1 part by weight of 2,6-di-tert. butyl-p-cresol was incorporated per 100 parts by weight of the resultant propylene polymer and the mixture was kneaded at 200° C. for 5 minutes using a mixer, laboplasto mill "MODEL 30C150" (trade name) manufactured by Toyo Seiki K.K. Subsequently, the polymer was analyzed and it was found that an isotactic pentad ($I_5$) was 0.447, a different bond due to a 2,1-insertion reaction and a different bond due to a 1,3-insertion reaction were less than the detection lower limits, i.e. less than 0.02 mol %, a melting point (Tm) was 148° C., a weight average molecular weight (Mw) was 413,000, a ratio (Mw/Mn) of the weight average molecular weight (Mw) to a number average molecular weight (Mn) was 2.2 and MFR was 0.30 g/10 minutes.

The production of the propylene polymer was repeated two times under the same condition as mentioned above. The physical properties of each material using the resultant polymer were measured. The result was shown in the following Table 1.

TABLE 1

|  | Example 1 | Example 2 | Comparative Example 1 |
|---|---|---|---|
| Elongation at Break (%) | 880 | 910 | 830 |
| Ultimate tensile strength (MPa) | 24.5 | 27.9 | 24.1 |
| Permanent set (%) | 14 | 56 | 16 |
| Compression set (%) | 57 | 73 | 55 |
| Durometer hardness | HDA80 | HDA90 | HDA87 |
| Haze (%) | 9 | 16 | 24 |

EFFECT OF THE INVENTION

The elastomeric polypropylene of the present invention is excellent in transparency, and in particular is a polypropylene having high transparency and excellent elastic characteristics even in the application for which relatively high durometer hardness is required.

What is claimed is:

1. An elastomeric polypropylene wherein (a) an isotactic pentad ($I_5$) is 0.150–0.749, (b) a different bond due to a 2,1-insertion reaction is 0.11–20 mol%, (c) a different bond due to a 1,3-insertion reaction is 0–10 mol% and (d) a melting point (Tm) is 50–160° C., (a) to (c) being determined from $^{13}C$ NMR spectra, obtained by the polymerization of propylene or a mixture of propylene and another olefin at a temperature of 20 to 80° C. in bulk polymerization, using any one of a metallocene catalyst (I) comprising a metallocene compound (A), an activating compound (B) and if desired, an organoaluminum compound (C); a supported metallocene catalyst (II) prepared by supporting the metallocene catalyst (I) on a finely particulate support (D); and a supported metallocene catalyst (III) prepared by adding an organoaluminum compound (E) to the supported metallocene catalyst (II).

2. The elastomeric polypropylene of claim 1 having an elongation at break of 100–2,000%, measured in accordance with JIS Method K6301.

3. The elastomeric polypropylene of claim 2 having a haze of 1–55%, measured in accordance with ASTM Method 1003 using a pressed sheet having a thickness of 1 mm prepared from said elastomeric polypropylene.

4. The elastomeric polypropylene of claim 2 having an ultimate tensile strength of 5–35 MPa, a permanent set of 3–75% and a compression set of 30–90% which are measured in accordance with JIS Method K6301.

5. The elastomeric polypropylene of claim 2 having a durometer hardness of type A (HDA) of 30–99 which is measured in accordance with JIS Method K7215.

6. The elastomeric polypropylene of claim 1 having a weight average molecular weight (Mw) of 30,000–1,000,000.

7. The elastomeric polypropylene of claim 6 having a molecular weight distribution (Mw/Mn) of 1.5–4.0.

8. The elastomeric polypropylene of claim 1 having a haze of 1–20% measured in accordance with ASTM Method 1003 using a pressed sheet having a thickness of 1 mm prepared from said elastomeric polypropylene.

9. The elastomeric polypropylene of claim 1, which is a homopolymer.

10. The elastomeric polypropylene of claim 1, which is a propylene/olefin copolymer.

11. The elastomeric polypropylene of claim 1 having a durometer hardness of type A (HDA) of 85–95 which is measured in accordance with JIS Method K7215.

12. The elastomeric polypropylene claim 1, wherein the metallocene compound (A) is the compound represented by formula (1):

$$L_2MX_2 \quad (1)$$

wherein M is titanium, zirconium or hafnium, each X may be identical or different and is selected from the group consisting of halogen, alkoxy, and hydrocarbon group of 1–7 carbon atoms, and each L may be identical or different and is represented by formula (2):

$$Ra\text{—}Ind \quad (2)$$

wherein Ra is a monocyclic- or polycyclic-heteroaromatic group containing a hetero atom selected from the group consisting of O, S, and N, which may be unsubstituted or substituted by an alkyl, aryl, aralkyl, alkoxy, or substituted silyl and the adjacent substituents may be joined together to form a cyclic structure thereby, and Ind is indenyl or cyclopentaphenanthryl, which may be unsubstituted or substituted by alkyl, aryl, aralkyl, alkoxy, substituted silyl, benzo or substituted benzo.

13. The elastomeric polypropylene of claim 12, wherein the Ra is a monocyclic- or polycyclic-heteroaromatic group containing an oxygen atom.

14. The elastomeric polypropylene of claim 12, wherein the Ra is an unsubstituted monocyclic- or polycyclic-heteroaromatic group.

15. The elastomeric polypropylene of claim 12, wherein the Ra is an unsubstituted 2-furyl.

16. The elastomeric polypropylene of claim 12, wherein the Ra is an unsubstituted 2-furyl, and Ind is indenyl substituted on at least 4-position by an alkyl, aryl, aralkyl, alkoxy, substituted silyl, benzo or substituted benzo.

17. The elastomeric polypropylene of claim 16, wherein the Ind is indenyl substituted on at least 4-position by phenyl or naphthyl.

* * * * *